Patented Apr. 22, 1952

2,593,411

UNITED STATES PATENT OFFICE 2,593,411

BIS(4-β-HYDROXYALKOXYPHENYL) SULFONES AND POLYESTERS PREPARED THEREFROM

John R. Caldwell, Kingsport, Tenn., assignor to Eastman Kodak Company, Rochester, N. Y., a corporation of New Jersey No Drawing. Application December 21, 1949,
Serial No. 134,340

20 Claims. (Cl. 260—75)

This invention relates to the preparation of bis (4-β-hydroxyalkoxyphenyl) sulfones, to the preparation of polyesters formed by reacting these sulfones with polybasic acids (especially the dibasic acids) and to the processes involved in the preparation thereof.

It is known that alkylene oxides react with bis (4-hydroxyphenyl) compounds of the formula

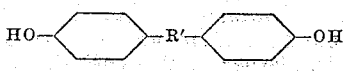

wherein R' represents an alkylidene or cycloalkylidene radical (U. S. Patent 2,331,265, issued October 5, 1943) to form bis(4-β-hydroxyalkoxyphenyl) compounds. This patent also discloses the esterification of these hydroxyalkoxy compounds with monobasic carboxylic acids; however, the products obtained are principally useful only as plasticizing agents for other resins because of their generally low melting or softening points. Thus, in Example 1 of the patent, 2,2-di(4-β-hydroxyethoxyphenyl)propane, is disclosed and is said to melt at approximately 112° C. In contrast, the products of my invention (wherein there is a sulfone group in place of the alkylidene or cycloalkylidene group) possess greatly increased melting points, e. g. the substitution of the $SO_2$ group for the 2,2-propylidene group in the above-mentioned compound described in Example 1 of the patent referred to, results in a product which melts at 184° C. which is an increase of 72° C. This is a very high melting point for a compound containing two ether linkages and is not believed to have been predictable from the characteristics of analogous known compounds.

According to my invention, I have found that bis(4 - β - hydroxyalkoxyphenyl)sulfones having the general formula:

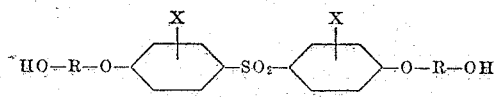

wherein R represents an alkylene radical and X represents one or more substituents selected from hydrogen atoms and/or lower alkyl radicals located in either the ortho or meta positions, can be prepared by reacting, in the presence of a catalyst, a bis(4-hydroxyphenyl) sulfone having the general formula:

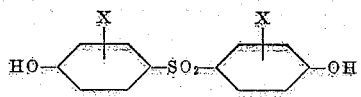

(X having been defined above), with an alkylene oxide wherein the epoxy linkage connects adjacent carbon atoms. Furthermore, I have also found that these bis(4-β-hydroxyalkoxyphenyl) sulfones form polyesters upon being reacted with polybasic carboxylic acids.

By "alkylene radicals," as employed herein, I means a divalent radical where R in the above formula has the formula:

wherein each of $R_1$ and $R_2$ represents a hydrogen atom or a low molecular weight alkyl radical such as a methyl or an ethyl radical. Thus, I specifically intend to include the radicals —$CH_2$—$CH_2$—; —$CH(CH_3)$—$CH_2$—
—$CH_2$—$CH(CH_3)$—; —$CH(CH_3)$—$CH(CH_3)$—
—$CH(C_2H_5)$—$CH_2$—; and —$CH_2$—$CH(C_2H_5)$— which come within the scope of my expression "alkylene radical containing from 2 to 4 carbon atoms" as employed hereinafter.

It is an object of my invention to provide new and useful compounds, viz. bis(4-β-hydroxyalkoxyphenyl) sulfones, and a process for their preparation. It is also an object of my invention to provide a new series of valuable polyesters of my new bis(4-β-hydroxyalkoxyphenyl) sulfones, especially bis(4-β-hydroxyethoxyphenyl) sulfone, with polybasic (particularly dibasic) acids and a process for their manufacture. Other objects will become apparent hereinafter.

The polyesters produced in accordance with my invention are valuable in the manufacture of fibers, threads, sheets, films, coating compositions, molding compositions, etc. These polyesters are characterized by their hardness and high melting point. One of the most important uses of these polyesters is in the field of protective coatings. These polyesters impart a high degree of surface hardness and moisture resistance when incorporated in various types of air drying and baking enamels, varnishes and lacquers.

In accordance with my invention I can react, in the presence of a catalyst, one or more bis(4-hydroxyphenyl) sulfones having the formula:

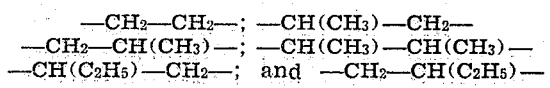

with one or more alkylene oxides containing from 2 to 4 carbon atoms wherein the epoxy linkage is across adjacent carbon atoms, to produce bis(4-

β-hydroxyalkoxyphenyl) sulfones having the general formula:

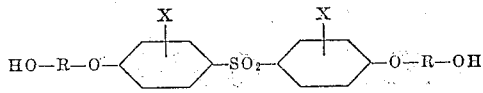

wherein R represents an alkylene radical containing from 2 to 4 carbon atoms and X has been previously defined.

When bis(4-hydroxyphenyl) sulfone is employed, it can be readily prepared by known methods from phenol and fuming sulfuric acid or chlorosulfonic acid. I can also employ nuclearly substituted bis(4-hydroxyphenyl) sulfones which can be prepared by reacting nuclearly substituted phenols with fuming sulfuric acid. Thus, bis(4-hydroxy-3-methylphenyl) sulfone can be prepared by heating o-cresol with fuming sulfuric acid, cf. Zehenter, Monatsh 33, 334, 335. Likewise, bis(4-hydroxy-2-methylphenyl) sulfone can be similarly prepared by employing m-cresol or it can be prepared by reacting m-cresol with 3-hydroxy-2-methyl phenylsulfonic acid in the presence of $P_2O_5$ at 170° C., cf. Zehenter, Bohunek and Nowotny, J. Prakt. Chem. (2) 121, 230. Similarly, other analogous compounds can be prepared by reacting other nuclearly substituted phenols, e.g. m-ethylphenol, o-ethylphenol, etc. with fuming sulfuric acid to produce bis(4-hydroxy-3-ethylphenyl) sulfone, bis(4-hydroxyethylphenyl) sulfone, etc.

The alkylene oxides which I can advantageously employ include ethylene oxide, 1,2-propylene oxide, 1,2-butylene oxide and 2,3-butylene oxide. Most advantageously I employ ethylene oxide. From 2 to 3 mols of the alkylene oxide are advantageously employed per mol of the bis-(4-hydroxyphenyl) sulfone. Larger and smaller ratios can also be employed; however, most advantageously a range of from 2.2 to 2.4 mols of the alkylene oxide per mol of the sulfone is employed.

It is advantageous to conduct the reaction in the presence of a catalyst. Advantageously, alkaline type catalysts such as the alkali metal hydroxides, alkoxides or alcoholates, and the quaternary ammonium hydroxides can be employed. Examples of such catalysts include sodium hydroxide, potassium propoxide, sodium ethoxide, potassium methoxide, potassium hydroxide, tetramethyl ammonium hydroxide, trimethylbenzyl ammonium hydroxide, etc. The proportion of catalyst advantageously employed varies from about 0.1% to about 1.0% by weight of the bis(4-hydroxyphenyl) sulfone being reacted. However, higher or lower percentages can also be employed. It is also possible to employ other alkaline catalysts than those specifically mentioned above, e. g. the alkaline earth alkoxides, alcoholates, etc.

In carrying out the reaction, it is advantageous to employ an unreactive solvent (viz. an inert solvent) which does not enter into the reaction itself. Solvents such as the lower aliphatic alcohols are most advantageously employed, e. g. methyl alcohol, ethyl alcohol, isopropyl alcohol, etc. However, other well known solvents may also be employed with advantage, e. g. dioxane, methoxyethyl alcohol, tetrahydrofuran, etc.

The reactants, catalyst and solvent can be placed in the reaction vessel in any desired sequence or simultaneously. Advantageously, the ethylene oxide can be introduced into a vessel containing the other materials, during the course of the reaction. The reaction can be advantageously conducted in a closed vessel under autogenous pressures.

Advantageously, I carry out the reaction at a temperature of from about 80° to about 140° C. Most advantageously I employ temperatures in the range of from 90° to 110° C. The reaction time required varies with the temperatures employed. Generally, from 3 to 8 hours is required.

Upon completion of the reaction the product can be readily purified by stirring with an aqueous dilute alkaline solution of KOH, NaOH, etc. to remove the unreacted bis(4-hydroxyphenyl) sulfone by dissolution thereof. The product can then be separated by filtration and recrystallized from a mixture of benzene and ethyl alcohol. Other methods of purification can also be used as may be expedient under any given set of circumstances, e. g. by fractional distillation, etc. The bis(4-β-hydroxyalkoxyphenyl) sulfones are soluble in many solvents such as dioxane, isopropyl alcohol, ethyl alcohol, hot acetone, hot methyl alcohol, etc.

The bis(4-β-hydroxyalkoxyphenyl) sulfones can be employed in the manufacture of the linear polyesters (referred to previously) by esterifying these sulfones with polybasic (especially dibasic) carboxylic acids. Since the bis (4-β-hydroxyalkoxyphenyl) sulfones possess unusually high melting points for their particular type of compounds (viz. diether compounds), the polyesters derived therefrom tend also to have high melting or softening points. In order to obtain polyesters possessing the highest melting or softening points, bis (4-β-hydroxyethoxyphenyl) sulfone is advantageously employed. The employment of the propylene and butylene derivatives, instead of the ethylene derivative, results in lower melting or softening points in the polyesters obtained and they are accordingly not as satisfactory for most purposes.

Advantageously I employ dicarboxylic acids containing from 4 to 10 carbon atoms selected from among the saturated and unsaturated aliphatic acids and the monocyclic aromatic acids. It is sometimes advantageous to employ the acids as their anhydrides or lower alkyl esters; hence, when I refer to an acid or to acids, it is to be understood that the anhydrides or esters can also be employed.

Examples of dicarboxylic acids which can be advantageously employed include succinic acid, glutaric acid, adipic acid, pimelic acid, sebacic acid, o-phthalic acid, terephthalic acid, m-phthalic acid, maleic acid, fumaric acid, itaconic acid, etc. The anhydrides and esters of these acids can also be employed in most instances with efficacy. The wide variety of saturated and unsaturated aliphatic and aromatic dibasic acids, anhydrides and esters which can be employed in reactions with dihydric alcohols to form linear polyesters is well set forth in the prior art and most of them can be utilized in accordance with my invention. Mixed polyesters containing the dihydric bis(4-β-hydroxyalkoxyphenyl) sulfones in combination with other dihydric and polyhydric alcohols such as the glycols, glycerine, etc. can also be prepared. In addition, oil-modified alkyd resins can be prepared by esterifying mixtures of the bis(4-β-hydroxyalkoxyphenyl) sulfones and glycerols with phthalic acid, linseed fatty acids, various other natural or derived acids, etc., according to known procedures. The method of esterification depends upon the type of product desired and upon the nature of the particular acids and/or additive glycols, glycerols, etc. being employed.

In preparing such esters it is usually advantageous to employ a condensation agent or catalyst such as sodium hydroxide, calcium oxide, zinc chloride, sulfuric acid, toluene sulfonic acid, etc. Other equally efficacious condensing agents or catalysts have been described in the prior art and can also be employed. It is also advantageous to employ an inert atmosphere, e. g. nitrogen, under which to conduct the polyesterification, especially when highly polymerized products are desired. Temperatures from about 125° C. to about 275° C. can be employed advantageously in conducting the polyesterification reaction.

The following examples will serve to illustrate further the manner of practicing my invention.

*Example 1.—Bis (4-β-hydroxyethoxyphenyl) sulfone*

26 g. of bis (4-hydroxyphenyl) sulfone, 200 cc. of methyl alcohol, 16 g. of ethylene oxide and 0.2 g. sodium hydroxide were placed in an autoclave under autogenous pressure and continually stirred while the temperature was maintained at 90° to 100° C. for 7 hours. The reaction mixture was then heated on a steam bath to evaporate the alcohol. The resulting crystals were then stirred with 50 cc. of a 5% sodium hydroxide solution to remove the unreacted bis (4-hydroxyphenyl) sulfone which remained. The product was then filtered, washed with cold water and dried. This product was then recrystallized from a mixture of benzene and ethyl alcohol and produced a yield of from 85 to 90% of bis (4-β-hydroxyethoxyphenyl) sulfone which was found to have a melting point of 184° C. An analysis showed that this compound contained 9.3% of sulfur as compared with the theoretical quantity of 9.5%.

*Example 2.—Bis (4-β-hydroxyethoxyphenyl) sulfone*

26 g. of bis (4-hydroxyphenyl) sulfone, 150 cc. of ethyl alcohol, and 0.4 g. of sodium ethoxide were placed in an autoclave which was kept closed under autogenous pressure and stirred at 120° C. for 3 hours. During this time, 16 g. of ethylene oxide was passed into the stirred mixture. The remainder of the process was carried out exactly as in Example 1 above. The product comprised a yield of 85 to 90% of bis (4-β-hydroxyethoxyphenyl) sulfone.

*Example 3.—Polyester of Example 1 sulfone with o-phthalic acid*

25 g. of bis (4-β-hydroxyethoxyphenyl) sulfone (prepared in accordance with Example 1) was mixed with 11.2 g. of o-phthalic anhydride and 0.03 g. of calcium hydroxide and heated at a temperature of from 180° to 200° C. for 5 hours in a stream of nitrogen. The product was a hard, tough resin, soluble in hot dioxane, acetone and ethylene dichloride. This resin can be incorporated in baking enamels with other resins such as phenolic resins, urea resins, and alkyd resins. Products having excellent surface hardness and moisture resistance are thereby produced.

*Example 4.—Polyester with adipic acid*

34 g. of bis (4-β-hydroxyethoxyphenyl) sulfone, 14.6 g. of adipic acid, and 0.05 g. of zinc chloride were mixed and heated at a temperature of from 160° to 170° C. for 3 hours in a stream of nitrogen. The temperature was then raised to from 200° to 220° C. and maintained for an additional 3 hours. The temperature was then increased to from 240° to 250° C. for 4 hours at a reduced pressure of 0.1 mm. of Hg pressure. The product was a hard, tough resin that softens at 150° to 160° C. It can be pulled into fibers when heated to the melting point. The product is also useful as a molding plastic.

*Example 5.—Polyester with o-phthalic anhydride and maleic anhydride*

34 g. of bis (4-β-hydroxyethoxyphenyl) sulfone was mixed with 7.4 g. of o-phthalic anhydride, and 5.0 g. of maleic anhydride. To this mixture, 100 cc. of xylene and 0.3 g. of toluene sulfonic acid were added. This mixture was refluxed for 6 hours in an apparatus equipped with a continuous decanter. Approximately 1.8 cc. of water was removed during this process. The xylene was then removed under a vacuum. The resulting product was a hard, tough resin. Manganese or cobalt naphthenates or oleates can be incorporated in this resin to produce coating compositions which air-dry when baked at from 120° to 130° C. for 1 hour. This resin is also useful for mixing with alkyd or oil-modified alkyd resins in the formulation of baking enamels whereby this resin imparts surface hardness and moisture resistance.

*Example 6.—Polyester with sebacic and fumaric acids*

34 g. of bis (4-β-hydroxyethoxyphenyl) sulfone, 8 g. of sebacic acid, 7 g. of fumaric acid and 0.01 g. of zinc chloride were heated in a stream of nitrogen at 150°–160° C. for 4 hours. The temperature was then raised to 190°–200° C. for 1 hour. The product was then heated at 190° C. for one additional hour under a pressure of 1 mm. of Hg. The resulting product was a hard, tough resin that is soluble in acetone. This resinous product can be employed to make hard insoluble films by forming the film or coating and baking it at 120° C. for 2 hours in the presence of from 0.1% to 0.3% of cobalt or manganese oleate.

Mixed esters containing bis (4-β-hydroxyethoxyphenyl) sulfone and other hydroxy-derivatives such as the diols, triols, etc., can be prepared in a manner similar to that set forth above. For example, a mixture of 2 parts of the dihydroxy sulfone prepared as described in Example 1 and 1 part of ethylene glycol can be esterified with o-phthalic acid to give a resin that results in improved surface hardness when incorporated in baking enamels.

When surface coating resins are desired, it is advantageous to employ a relatively low molecular weight polyester. To obtain such a polyester, the bis (4-β-hydroxyethoxyphenyl) sulfone (prepared as in either Example 1 or 2) can be heated together with a suitable polybasic acid, ester or anhydride at a temperature of from 180° to 200° C. for from 3 to 6 hours until a product is obtained having a desirable acid number of, for example, from 10 to 20. Catalysts such as calcium oxide, zinc chloride, sodium hydroxide or sulfuric acid can be advantageously employed.

When it is desired to produce polyesters useful in the manufacture of fibers and molding plastics, it is advantageous to employ polyesters having higher molecular weights. In such cases, the resins require relatively long periods of heating at elevated temperatures, e. g. from about 200° to about 260° C. and must thereafter be heated in a vacuum to complete the polyesterification reaction. To obtain such a resin, for example, a temperature of 180° to 220° C. can be employed during the first stage of the reaction for from 3 to 4 hours at atmospheric pressure. The intermediate product can then be heated at 230° to 260° C. at a greatly reduced pressure, e. g. 0.1 mm. of Hg pressure, for from 3 to 6 hours to complete the reaction. Of course, other low pressures can also be employed. Catalysts can also be employed to advantage, e. g. those already mentioned above.

It is thus apparent that a wide variety of resins having a broad range of useful properties can be prepared by procedures similar to those set forth in the working examples above. The choice of reactants and the conditions under which the reaction takes place can be varied to suti the purpose desired.

What I claim is:

1. A process for preparing a compound having the formula:

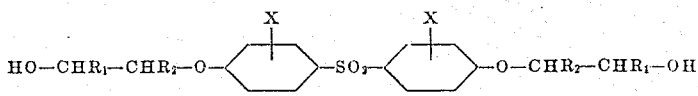

wherein $R_1$ and $R_2$ contain, when added together, no more than 2 carbon atoms and X, $R_1$ and $R_2$ each represents a member selected from the group consisting of a hydrogen atom, a methyl radical and an ethyl radical, X being located in a position selected from the ortho and meta positions on the benzene nuclei, which process comprises reacting, in the presence of an alkaline catalyst at temperature of from about 80° C. to about 140° C., a bis(p-hydroxyphenyl) sulfone having the formula:

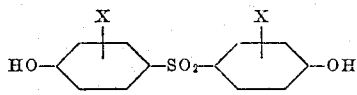

wherein X is defined and located as above, with an ethylene oxide derivative having the formula:

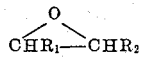

wherein $R_1$ and $R_2$ are defined and limited above.

2. A process as defined in claim 1 wherein X, $R_1$ and $R_2$ each represents a hydrogen atom.

3. A process as defined in claim 2 wherein the alkaline catalyst is selected from the group consisting of the alkali metal hydroxides and alkoxides.

4. A process as defined in claim 3 wherein one mol proportion of the bis (p-hydroxyphenyl) sulfone is reacted with from 2 to 3 mol proportions of ethylene oxide.

5. A process as defined in claim 4 wherein the reaction is conducted in the presence of an unreactive organic solvent.

6. A process as defined in claim 5 wherein the alkaline catalyst is present to the extent of from about 0.1% to about 1% of the initial weight of bis (p-hydroxyphenyl) sulfone.

7. A process as defined in claim 6 wherein the reaction is conducted in a closed vessel under autogenous pressure at a temperature of from about 90° C. to about 110° C.

8. Bis (4 - β - hydroxyethoxyphenyl) sulfones having the formula:

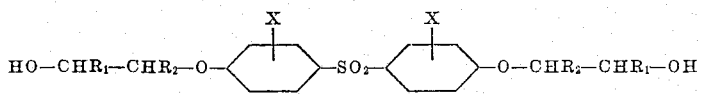

wherein $R_1$ and $R_2$ contain, when added together, no more than 2 carbon atoms and X, $R_1$ and $R_2$ each represents a member of the group consisting of a hydrogen atom, a methyl radical and an ethyl radical, X being located in a position selected from the ortho and meta positions on the benzene nuclei.

9. Bis (4-β-hydroxyethoxyphenyl) sulfone.

10. A process for preparing polyesters comprising reacting at a temperature of from about 125° C. to about 275° C. in the presence of a condensing agent, a dicarboxyl compound containing from 4 to 10 carbon atoms selected from the group consisting of the saturated and unsaturated aliphatic dicarboxylic acids and the monocyclic dicarboxylic aromatic acids and the anhydrides and lower alkyl esters of each of these acids, with bis (4-β-hydroxyethoxyphenyl) sulfone.

11. Polyesters prepared in accordance with the process defined in claim 10.

12. A process as defined in claim 10 wherein the dicarboxyl compound is a saturated aliphatic acid having the formula:

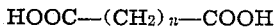

wherein $n$ represents an integer from 2 to 8.

13. Polyesters prepared in accordance with the process defined in claim 12.

14. A process as defined in claim 10 wherein the dicarboxyl compound is selected from the group consisting of ortho-phthalic acid, meta-phthalic acid and terephthalic acid.

15. Polyesters prepared in accordance with the process defined in claim 14.

16. A process as defined in claim 10 wherein the dicarboxyl compound is selected from the group consisting of maleic acid and fumaric acid.

17. Polyesters prepared in accordance with the process defined in claim 16.

18. A process as defined in claim 10 wherein the reaction is conducted in an inert atmosphere.

19. A process as defined in claim 10 wherein the reaction is conducted in an inert atmosphere and the temperature of the reaction is increased as the reaction proceeds and the pressure is greatly reduced when the temperature has been raised above 190°–200° C.

20. Polyesters prepared in accordance with the process defined in claim 19.

JOHN R. CALDWELL.

REFERENCES CITED

The following references are of record in the file of this patent:

UNITED STATES PATENTS

| Number | Name | Date |
|---|---|---|
| 2,324,483 | Castan | July 20, 1943 |
| 2,444,333 | Castan | June 29, 1948 |